United States Patent
Scheer et al.

(10) Patent No.: US 7,580,991 B2
(45) Date of Patent: Aug. 25, 2009

(54) METHODS AND APPARATUSES TO CONFIGURE AND DEPLOY SERVERS

(75) Inventors: Lyle N. Scheer, Ashland, OR (US); Jonathan M. Traxler, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 571 days.

(21) Appl. No.: 10/042,092

(22) Filed: Jan. 7, 2002

(65) Prior Publication Data

US 2003/0131078 A1    Jul. 10, 2003

(51) Int. Cl.
    G06F 15/177    (2006.01)
(52) U.S. Cl. ........................ 709/220; 709/223
(58) Field of Classification Search ................ 709/220, 709/223
    See application file for complete search history.

(56) References Cited

U.S. PATENT DOCUMENTS

| | | | |
|---|---|---|---|
| 5,758,165 A | | 5/1998 | Shuff |
| 5,821,937 A * | 10/1998 | Tonelli et al. ............... 715/853 |
| 5,831,610 A * | 11/1998 | Tonelli et al. ............... 715/735 |
| 5,832,503 A * | 11/1998 | Malik et al. .................. 709/223 |
| 5,835,726 A * | 11/1998 | Shwed et al. ............... 709/229 |
| 5,842,001 A | 11/1998 | Kubota |
| 5,978,911 A * | 11/1999 | Knox et al. .................... 713/1 |
| 6,012,088 A * | 1/2000 | Li et al. ....................... 709/219 |
| 6,058,262 A * | 5/2000 | Kawas et al. .................. 703/13 |
| 6,066,182 A * | 5/2000 | Wilde et al. .................. 717/175 |
| 6,108,697 A * | 8/2000 | Raymond et al. ............. 709/218 |
| 6,205,477 B1 * | 3/2001 | Johnson et al. .............. 709/220 |
| 6,229,540 B1 * | 5/2001 | Tonelli et al. ................ 715/735 |
| 6,253,300 B1 | 6/2001 | Lawrence et al. |
| 6,262,726 B1 | 7/2001 | Stedman et al. |
| 6,301,612 B1 * | 10/2001 | Selitrennikoff et al. ....... 709/220 |
| 6,330,005 B1 * | 12/2001 | Tonelli et al. ................ 715/735 |
| 6,567,849 B2 * | 5/2003 | Ludovici et al. ............. 709/223 |
| 6,636,958 B2 * | 10/2003 | Abboud et al. ............... 711/173 |
| 6,735,548 B1 * | 5/2004 | Huang et al. ................. 702/179 |
| 6,751,658 B1 * | 6/2004 | Haun et al. ................... 709/222 |
| 6,829,216 B1 * | 12/2004 | Nakata ......................... 370/228 |
| 2002/0184484 A1 * | 12/2002 | Abboud et al. ............... 713/100 |
| 2002/0188700 A1 * | 12/2002 | Steitle et al. ................. 709/220 |
| 2003/0055919 A1 * | 3/2003 | Fong et al. ................... 709/220 |

OTHER PUBLICATIONS

Sun Microsystems brochures regarding Cobalt appliances, copyright 1994-2001, What is the Sun Cobalt RaQ XTR server appliance?, 2 pages, http://www.cobalt.com/products/xtr/index.html.
Cobalt RaQ Server Services, Cobalt Networks, 3 pages, http://www.theplanet.com/html/services_colbalt.html.
Sun Cobalt™ RAQ™ 4 Server Appliance, Superb Developer Tool Support for More Hosted Applications, 2 page article, 2001.
Tutorial By: *SatCP*, How To Create A Bootable Ghost Rescue Cd, The Coaster Factory, copyright 1999-2001, 8 pages, plus 6 page supplement, http://www.ping.be/satcp/ghostresq01.htm.

* cited by examiner

*Primary Examiner*—John Follansbee
*Assistant Examiner*—Kamal B Divecha
(74) *Attorney, Agent, or Firm*—Brooks Kushman P.C.

(57) ABSTRACT

Various methods, apparatuses, and systems that configure a digital image for a target server, build the digital image, and deploy the digital image onto the target server.

17 Claims, 3 Drawing Sheets

METHODS AND APPARATUSES TO CONFIGURE AND DEPLOY SERVERS

FIELD OF THE INVENTION

This invention generally relates to server technology. More particularly an aspect of this invention relates to configuring and deploying one or more servers.

BACKGROUND OF THE INVENTION

Typically, a server is a hardware computerized-device having software with a specific purpose in a network shared by multiple users. Servers generally have pre-installed software to perform a dedicated service. For example, a Web server refers to a computer system dedicated to a Web server application. Likewise, mail servers, database servers, print servers, network access servers and other similar servers exist to perform the corresponding function. A server usually requires an end user to ship the hardware back to the manufacturer to fundamentally change the purpose of a server. The manufacturer would then use a coded key, such as a digital signature, to burn a new digital image into the server hardware in order to change the purpose of a server, for example, from a mail server to a print server. Accordingly, a server manufacturer typically installs a digital image onto the server prior to sending the server to the user. A digital image is usually a file in a compressed file format that contains an exact replica of the applications, operating system, and configuration settings of a fully operational source computerized device at the time when the digital image was created.

Integration of a server farm deployment has typically required manual coordination of the protocol for network monitoring and control, such as Simple Network Management Protocol (SNMP), the protocol to build images for servers in the server farm, the deployment protocol, and the components within the network. A user, such as a system administrator, configures servers having pre-installed digital images to operate with the network protocols and monitoring and control protocols. After the digital images and software have been installed, the user configures each component in the network to have links to each other to work as a clustered group. As a last step, the user then typically utilizes a deployment protocol to create an operational server farm. A server farm typically refers to a cluster of servers and other networked components that work together as a group. The server farm components are linked together to handle variable workloads, communicate with each other, and/or to provide continued operation in the event one component fails. Protocols such as SNMP generally have no protocol to build digital images for servers as well as no deployment protocol to strategically arrange the networked components in an operational topology.

SUMMARY OF THE INVENTION

Various methods, apparatuses, and systems that configure a digital image for a target server, build the digital image, and deploy the digital image onto the target server.

BRIEF DESCRIPTION OF THE DRAWINGS

The drawings refer to the invention in which.

Figure 1:
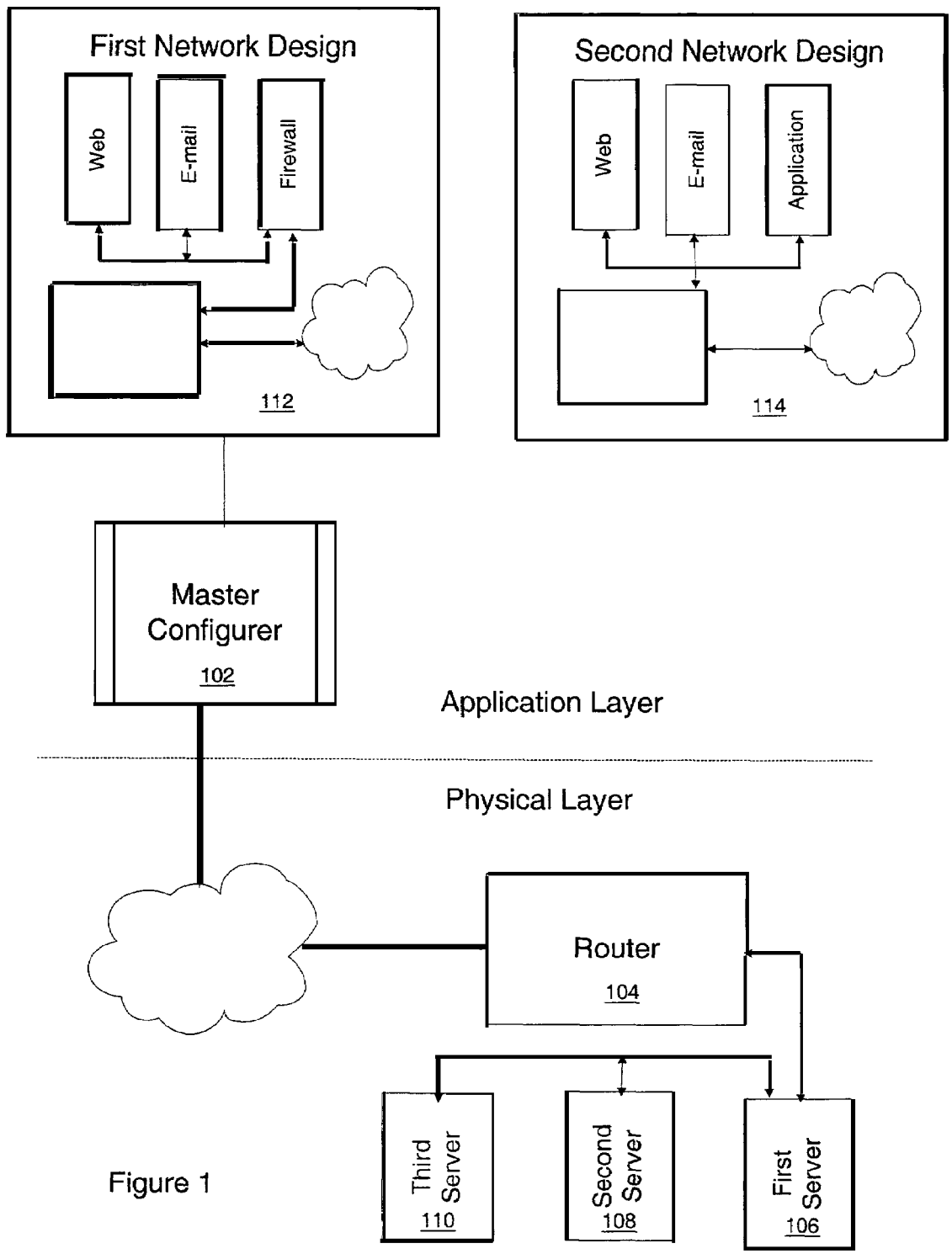
FIG. 1 illustrates an embodiment of a system to configure, build, and deploy a dynamic digital image for one or more components in a network after receiving a design.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory columns in a group of memory columns, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, various methods, apparatuses, and systems are described that configure a digital image for a target server, build the digital image, and deploy the digital image onto the target server.

FIG. 1 illustrates an embodiment of a system to configure, build, and deploy a dynamic digital image for one or more components in a network after receiving a design. The system 100 includes a master configure 102 and a network with components, such as a router 104, a first server 106, a second server 108 and a third server 110. The master configure 102 may use one or more network designs such as a first network design 112 or a second network design 114 to base the configuring and building of the digital images for the network components. In an embodiment, master configurer 102 may connect to one or more servers but three will be used to illustrate aspects of the invention.

A user may submit a first network design 112 to the master configurer 102. Alternatively, the user may use a wizard program having graphic user interface 228 that resides on the master configurer 102 to create the network design. Either way, the master configurer 102 receives the first network design 112. The master configurer 102 uses the design of the network to configure the digital images of each network component to include the unique operational network settings for that network. The network settings may include the IP address assigned to various components in the network, port and socket settings, as well as other similar variables. The master configurer 102 then builds a digital image for one or more components in the network to create the designed network. In an embodiment, the master configurer 102 dynamically builds the digital images because the building operations are performed "on the fly" in the master configurer 102 to incorporate the operational network configuration settings rather than a digital image made beforehand during the manufacturing process.

The master configurer 102 then deploys the digital images onto the corresponding components in the network in order to produce an operational server farm. In an embodiment, a server farm consists of a group of networked components configured to be aware of other components in the network and linked to one or more of the other components within the network. In an embodiment, the components in the operational server farm communicate with each other and work cohesively without the user needing to manually change settings or parameters on the software on those components.

The master configurer 102 may be a central server that contains various logic blocks. A logic block may be logic designed to accomplish a specific function consisting of electronic circuits that follow the rules of Boolean Logic, software that contain patterns of instructions, or a combination of both. The logic allows the integration of a network of addressable components to be designed, mapped out with the desired network topology, and deployed from the master configurer 102. Thus, the master configurer 102 may assist in the design, address configuration, links configuration, and deployment of a digital image on individual servers in a server farm.

The logic identifies each component in the network through user input, detection, or a component-initiated request for identification. A user may supply the amount and types of hardware components available in the network making up the server farm. The logic may generate a snoop signal to detect what type of device such as a server or a router 104, exists on a given IP address. Additionally, the master configurer 102 may receive a remote boot signal from each server in the network that identifies that network component as a server.

The logic tracks what Internet Protocol (IP) addresses are available in the network, which of the available IP addresses have been assigned, and the particular component assigned that IP address. All nodes in a TCP/IP network, for example, clients, servers, routers, etc., are assigned an IP address. Thus, the router 104, the first server 106, the second server 108, and the third server 110 all have an IP address.

As noted, the master configurer 102 may assist in the design, address configuration, links configuration, and deployment of a digital image on individual servers in a server farm.

For example, the first network design 112 may cause the master configurer 102 to build, configure, and deploy a network having a firewall server, a web server, and an email server all routed by the router 104 to the same domain name. The master configurer 102 may import from a database a generic digital image containing all of the necessary software to create a functional firewall server. Next, the master configurer 102 may consult a design rule logic block 220 to determine that the firewall server should be layered as the first device to receive incoming data packets. A firewall server typically contains anti-virus and security software to protect the inner network components from a hacker or virus threat external to the local network. The master configurer 102 then configures the digital image for the firewall server to be aware of the other two servers in the network and the router 104 in the network. The master configurer 102 then configures links into the digital images for the firewall server between the firewall server and the router 104, between the firewall server and the web server, as well as between the firewall server and the e-mail server.

The master configurer 102 then configures network settings in the digital images for the e-mail server and web server to work cohesively with the firewall server and each other. The master configurer 102 then configures the IP addresses and links for the digital images of the web server and e-mail server. The master configurer 102 dynamically builds digital images for each network component once the generic digital images are imported and pre-configured to be fully operational.

The master configurer 102 may then deploy the dynamically built digital images over a network connection onto each corresponding server. In an embodiment, the master configurer 102 deploys dynamic digital images over a network connection in response to a net boot request from a server. Thus, the first server 106 may be deployed as a firewall server, the second server 108 deployed as an e-mail server, and the third server 110 may be deployed as a web server.

The master configurer 102 may redeploy digital images for the same network. Over time the need for new network design may arise. For example, due to upgrades of the software in the digital images of the web server and the e-mail server, a firewall server is no longer necessary. Thus, the dedicated purpose of the first sever 106 may be changed from a firewall server to another server such as an application server. The master configurer 102 imports a generic application server digital image, reconfigures all of the digital images in that network to operationally work with an application server, rebuilds all of the new digital images, and then deploys the new digital images to each component in the network.

Figure 2:
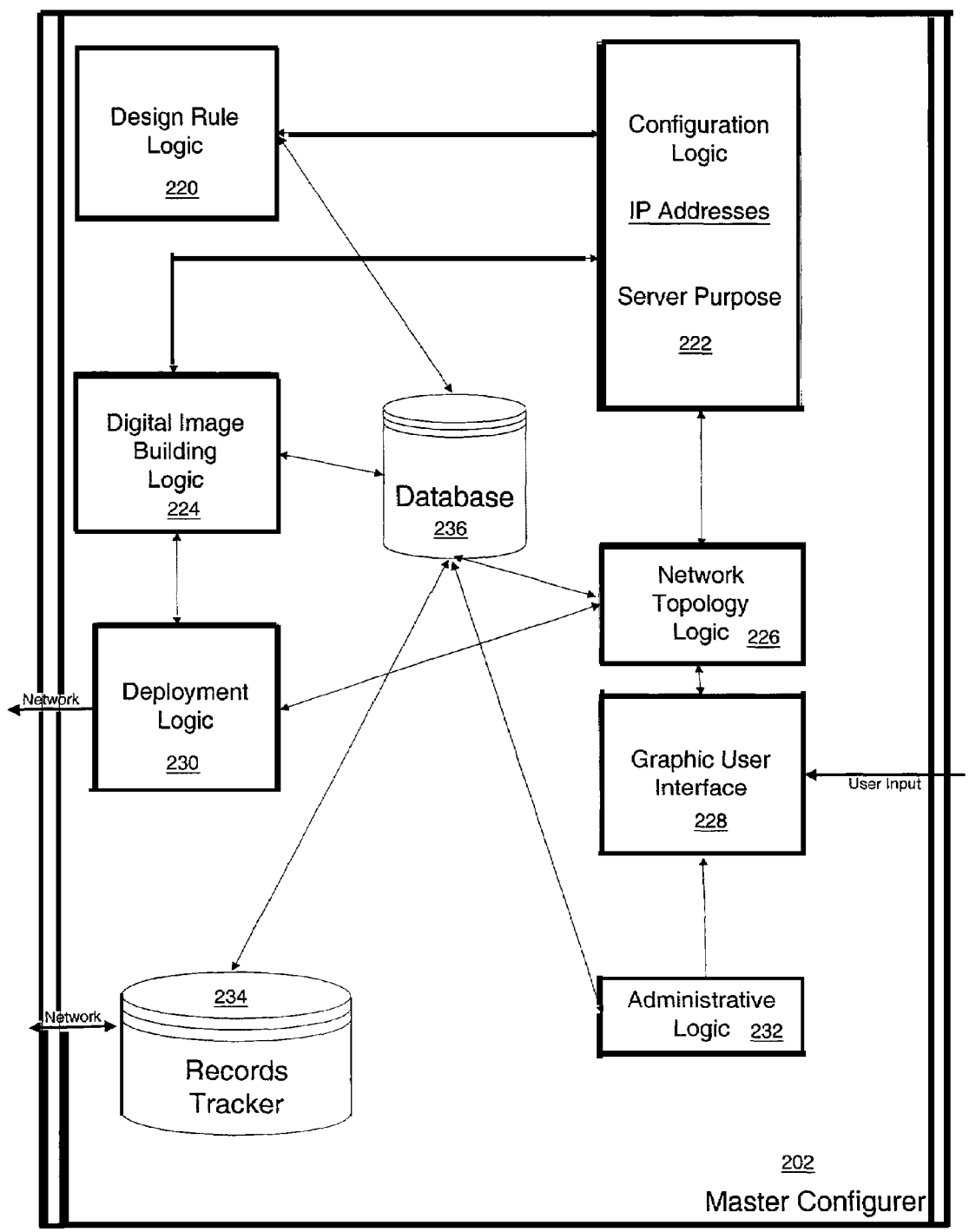
FIG. 2 illustrates an embodiment of a master configurer having logic to configure settings in a digital image for a target server, build the digital image, and deploy the digital image onto that target server.

FIG. 2 illustrates an embodiment of a master configurer 202 having logic to configure settings in a digital image for a target server, build the digital image, and deploy the digital image onto that target server. In an embodiment, the master configurer 202 may contain logic such as a design rule logic block 220, a configuration logic block 222, a digital image building logic block 224, a network topology logic block 226 which includes a graphic user interface 228, a deployment logic block 230, an administrative logic block 232, a records tracker 234, and a database 236. As noted, a logic block may be logic designed to accomplish a specific function consisting of electronic circuits that follow the rules of Boolean Logic, software that contain patterns of instructions, or a combination of both.

The design rule logic block 220 contains instructions as to how a component in the network can and cannot be employed in the network. Each server type, such as a firewall server, etc., may have a data sheet reflecting required and preferred network settings applications, other server types and applications that cause conflicts, as well as other design characteristics associated with that specific server type. For example, the rule base may include a set of rules that govern what is and what is not allowed through the firewall. Firewall servers must be assigned to a certain IP address. E-mail servers and web servers must be assigned to certain sockets and ports.

Data packets identify a target program operating on the server with which to communicate by its socket. A socket is a combination of (1) the server's IP address and (2) the program's port. If the data packet does not know the IP address, but knows the server by name, the data packet uses a Domain Name System server (DNS server) in the configuration logic block to turn the name into the IP address. The port may be a logical number assigned to every application. For FTP, SMTP, HTTP and other common applications, there are agreed-upon numbers known as "well-known ports." For example, HTTP applications (World Wide Web) are on port 80, so a web server is located by its IP address and port 80.

The digital image building logic block 224 contains digital imaging software to build a digital image for a server. In response to the network design topology and server purposes requested, the digital image building block 224 generates dynamic digital images for the components in the network.

The digital image building logic block 224 may import a generic digital image corresponding to a given server type, such as a web server, from the database. The logic block may install any additional custom applications, pre-configured links and IP addresses from the configuration logic block 222, and custom content, as well as other information into the generic digital image.

A wizard program may guide a user through a graphic user interface 228 to generate a network topology for the new network. Network topology is the pattern of interconnection between nodes (network components); for example, a bus configuration, ring configuration, or star configuration. The user may provide a design list of functions that the server farm should perform, the amount and type of hardware components that populate the network, and the number of WAN IP addresses assigned to the network. The graphic user interface 228 may forward the information to the network topology logic block 226. The network topology block 226 then uses an algorithm to determine the type or types of network topologies needed to meet the design list requirements submitted by the user. The network topology block 226 then imports various network topologies from the database that meet the design list requirement. The graphic user interface 228 illustrates these network topology options to the user and allows the user to choose one of the network topologies to deploy.

The wizard program also allows a user to submit a network design, a design list of functions that the server farm should perform, the amount and the type of hardware components that populate the network, and the number of WAN IP addresses assigned to the network. The network topology logic 226 in conjunction with the design rule logic block 220 analyzes the user's network design to ensure that the user's network design will operate cohesively. The graphic user interface 228 conveys the network topology logic block's 226 analysis to the user.

The deployment logic block 230 executes a deployment of a digital image over a network connection onto one or more components in the network. In an embodiment, once the digital image is on the target server, a self-executing installing program installs the digital image on the target server. In an embodiment, the deployment logic block 230 may respond to a broadcast request of the server to restore the digital image. In an embodiment, the deployment logic block 230 in parallel sends digital images to two or more components in the network because the master configurer 202 automatically pre-configures IP addresses and links in every network component automatically. Thus, the master configurer 202 may deploy two or more dynamic images at approximately the same time.

The configuration logic block 222 may contain a configuration file that sets various logical or physical switches and jumpers for hardware and defines values of parameters for software. In an embodiment, the configuration logic 222 generates the unique network settings, such as IP addresses and ports, for each component to make sure the application layer of each server farm is pre-configured into each digital image prior to the digital image being deployed. In an embodiment, the configuration logic 222 stores the IP address unique to all of the components in each server farm associated with the master configurer 202 and the dedicated purpose of each server in the one or more server farms. In an embodiment, the configuration logic 222 includes a domain name server.

In an embodiment, the configuration logic 222 may install network translation software on a server if the network has fewer WAN IP addresses than component nodes needed. In a network, every component exists on a unique IP address, i.e., a node. The node address may be a real WAN IP address and thus accessible directly to devices external to the network, or the node may be a virtual IP address. A virtual IP address makes that node accessible directly to components within the network linked to that virtual IP, and accessible to devices external to the network only through another networked component containing network translation software to route data packets to and from the virtual IP address.

Referring to FIG. 1, the first network design 112 uses only one WAN IP address and network translation software installed on the digital image of the firewall server on the first server 106. The second network design 114 could also use one WAN IP address and network translation software for the first server 106. Alternatively, the second network design 114 could use three discreet WAN IP addresses for the first server 106, second server 108, and third server 110.

Referring to FIG. 2, the database 236 stores information such as various typical network topologies 226, typical network configuration settings, generic digital images for servers, design rules, and pointers to the records tracker 234, as well as other information.

The records tracker 234 keeps track of frequently changing variables concerning the server farms associated with the master configurer 202. The records tracker 234 may contain pointers to remote network backups of custom content on each server in the server farm, custom applications on each component's digital image, revision control data for each component's digital image, specific network topology of each network associated with the master configurer 202, the amount and type of components in each network associated with the master configurer 202, as well as other similar variables.

The administrative logic 232 may contain logic to perform ministerial tasks such as turning the master configurer 202 remote on or off, control of the master configurer 202, updates for the logic in the master configurer 202, etc.

In an embodiment, the master configurer 202 may build and deploy the network from the network design without user intervention except to provide the WAN IP available. In an embodiment, the digital image for a single hardware server may contain an integrated digital image providing e-mail services, web hosting, internet standard file transfer protocol as well as other server functions.

Figure 3:
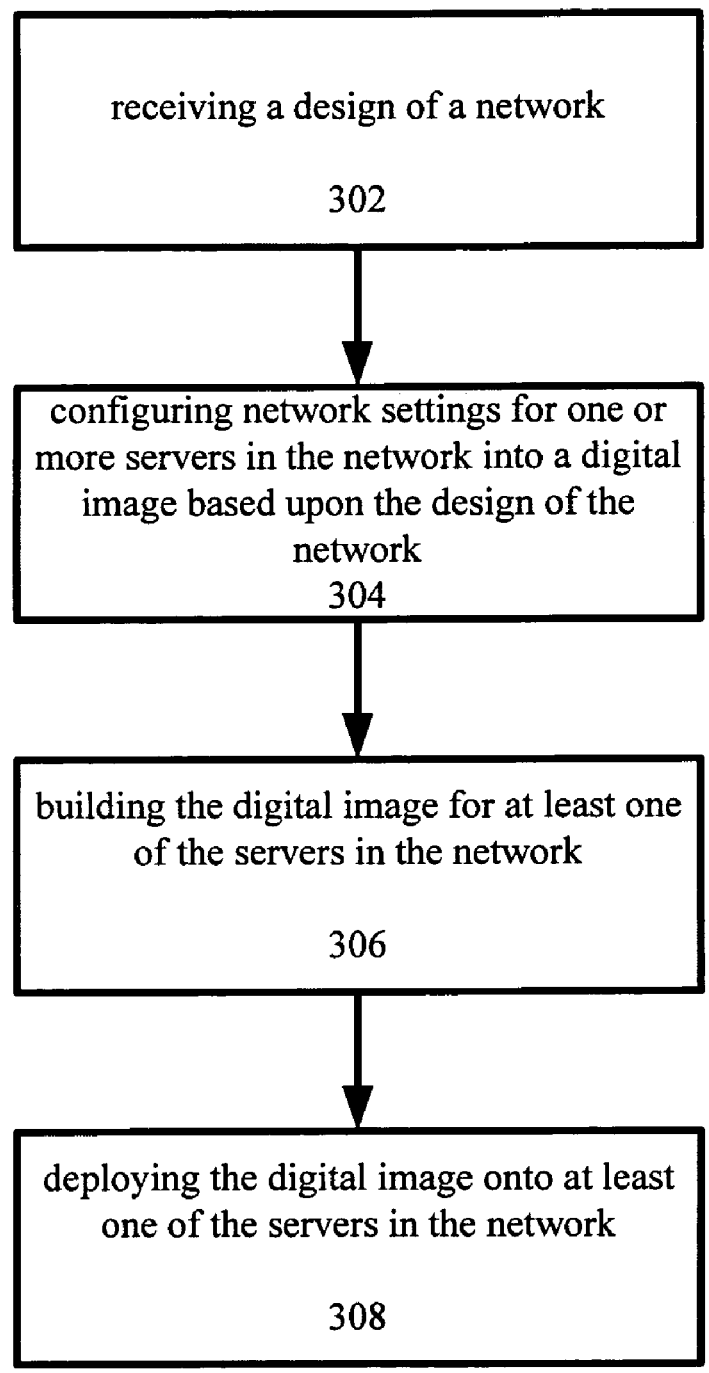
FIG. 3 illustrates a method to configurer a digital image for a target server, build the digital image. and deploy the digital image to the target server.

A summary of actions performed by the master configurer 202 according to one embodiment of the inventions is now provided with reference to FIG. 3. In block 302, the master configurer receives a design of a network. In block 304, it configures network settings for one or more servers in the network into a digital image based upon the design of the network. In block 306, it builds the digital image for at least one of the servers in the network. And in block 308, the master configurer deploys the digital image onto at least one of the servers in the network.

In one embodiment, portions of the logic may be application software, operating software, and other types of digital instructions embodied onto a machine-readable medium. A machine-readable medium includes any mechanism that provides (e.g., stores) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. Slower media could be cached to a faster, more practical, medium.

Some portions of the detailed descriptions above are presented in terms of application software, operating software, and other types of digital instructions to cause operations on data bits within a memory. The software descriptions and representations are the means used by those skilled in the data processing arts to most effectively convey the substance of their work to others skilled in the art. Software is generally conceived to be a self-consistent sequence of steps leading to a desired result. The steps acre those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "analyzing " or "computing" or "configuring" or "determining" or "displaying" or the like, refer to the action and processes of a computing system that manipulates and transforms data represented as physical (electronic) quantities within the computing system's registers and memories into other data similarly represented as physical quantities within the computer system memories or registers, or other such information storage, transmission or display devices.

While some specific embodiments of the invention have been shown, the invention is not to be limited to these embodiments. The invention is to be understood as not limited by the specific embodiments described herein, but only by scope of the appended claims.

What is claimed is:

1. A method, comprising:
   receiving a design list for a plurality of network servers, the design list comprising functions of a network, amount of hardware for the network, type of hardware for the network and number of WAN IP addresses assigned to the network;
   generating a plurality of network designs for the plurality of network servers based upon a design rule and the design list, further comprising receiving a first network design of the plurality of network designs, and wherein the design rule determines a first server in the network is a gateway server layered in a network location, and wherein the gateway server is first in receiving all incoming data packets to the network;
   configuring software and hardware settings for the plurality of network servers in the network, the software and hardware settings including switches, jumpers, IP address, links, ports and values of software parameters, the configuration of the software and hardware settings based upon the design rule and the first network design wherein the software and hardware settings are determined to provide cohesive network settings operable to interconnect the plurality of network servers;
   building a respective digital image with the software and hardware settings for each of the plurality of servers, each design corresponding to a digital image for a respective network server, the plurality of servers having a different server type than the first server and operable to support dissimilar operations; and
   deploying each of the respective digital images onto the plurality of servers without user intervention except to provide the number of WAN IP addresses.

2. The method of claim 1, wherein the digital image is dynamically built from at least one generic digital image to include at least one custom application.

3. The method of claim 2, further comprising:
   deploying the dynamically built digital image over a network connection in response to a netboot request from the first server.

4. The method of claim 1, wherein the number of WAN IP addresses is fewer than the number of servers in the network and wherein configuring network settings comprises sending a request to a Domain Name System server.

5. The method of claim 1, further comprising determining server type, the server type indicative of the configured parameters.

6. The method of claim 5 wherein deploying further comprises deploying images for a plurality of servers at substantially the same time, the plurality of servers including servers of a dissimilar server type.

7. A computer readable storage medium encoded with a set of instructions that, when executed by a processor in the computer, cause the computer to perform a method, the computer readable storage medium comprising:
   a graphic user interface having a function to receive a design list for a plurality of network servers, the design list comprising functions of a network, amount of hardware for the network, type of hardware for the network, and number of WAN IP addresses assigned to the network;
   design rule logic having design instructions, wherein the design instructions determine a first server in the network is a gateway server layered in a network location and wherein the gateway server is first to receive all incoming data packets to the network;
   network topology logic having a function to generate a plurality of network designs for the plurality of network servers according to the design list and the design instructions, wherein a first design of the plurality of network designs is selected through the graphic user interface;
   configuration logic to configure software and hardware settings for the plurality of network servers in the network, the software and hardware settings including switches, jumpers, IP address, links, ports and values of software parameters, the configuration of the software and hardware settings based upon the design instructions and the first network design;
   digital image building logic to build a respective digital image with the software and hardware settings for each of the plurality of servers, each design corresponding to a digital image for a respective network server, the plurality of servers having a different server type than the first server and operable to support dissimilar operations; and
   deployment logic to deploy each of the respective digital images onto the plurality of servers without user intervention except to provide the number of WAN IP addresses, the second server accessible to network traffic via the first server.

8. The apparatus of claim 7, wherein the number of WAN IP addresses is fewer than number of the servers in the network.

9. The computer readable storage medium of claim 7, wherein the design rule logic determines how a server in a network can or cannot be employed in the network.

10. The computer readable storage medium of claim 7, wherein the configuration logic installs network translation software on a third server in the network, wherein the network translation software routes data packets to and from a virtual IP address of the network.

11. A computer-implemented method for configuring and deploying network servers, the method comprising:

receiving a design list for a plurality of network servers, the design list comprising functions of a network, amount of hardware for the network, type of hardware for the network and number of WAN IP addresses assigned to the network;

generating a plurality of network designs for the plurality of network servers based upon a design rule and the design list, further comprising receiving a first network design of the plurality of network designs, and wherein the design rule determines a first server in the network is a gateway server layered in a network location, and wherein the gateway server is first in receiving all incoming data packets to the network;

configuring software settings for a plurality of network servers, at least two of which have different server functions, based upon a network design specifying functions of each of the plurality of network servers and a number of assigned WAN IP addresses, and based upon a selected network topology, settings for each server being configured to implement the selected network topology and server function using the number of assigned WAN IP addresses;

building a respective configured digital image for each of the plurality of network servers by importing a generic digital image corresponding to a given server function and incorporating the corresponding software configuration settings to implement the selected network topology and server function; and deploying each configured digital image to a corresponding one of the plurality of network; and wherein building the respective configured digital image for each server and deploying each configured digital image is done without user intervention except to provide the number of WAN IP addresses.

12. The method of claim 11 further comprising:

incorporating network translation software into the configured digital image if the number of assigned WAN IP addresses is less than a number of components specified in the network design.

13. The method of claim 11 further comprising selecting a network topology from a list of potential network topologies wherein the potential network topologies are determined by network topology logic based on the number and function of the plurality of network servers in the network design.

14. The method of claim 11 wherein configuring comprises configuring the plurality of servers to be aware of other components within the network and linked to one or more of the other components within the network to produce a server farm after the configured digital images are deployed to corresponding servers.

15. The method of claim 11 further comprising automatically installing each configured digital image on a corresponding server after deploying.

16. The method of claim 11 wherein deploying is performed in response to a netboot request.

17. The method of claim 11 wherein at least one of the plurality of servers functions as a firewall server and wherein configuring comprises incorporating rules that govern what is allowed and what is not allowed through the firewall into the configured digital image.

* * * * *

UNITED STATES PATENT AND TRADEMARK OFFICE
CERTIFICATE OF CORRECTION

PATENT NO. : 7,580,991 B2  Page 1 of 1
APPLICATION NO. : 10/042092
DATED : August 25, 2009
INVENTOR(S) : Scheer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Fourteenth Day of September, 2010

David J. Kappos
*Director of the United States Patent and Trademark Office*